July 29, 1969   D. D. DEFORD   3,457,708
MATERIAL CONTACTING APPARATUS
Filed March 6, 1967   2 Sheets-Sheet 1
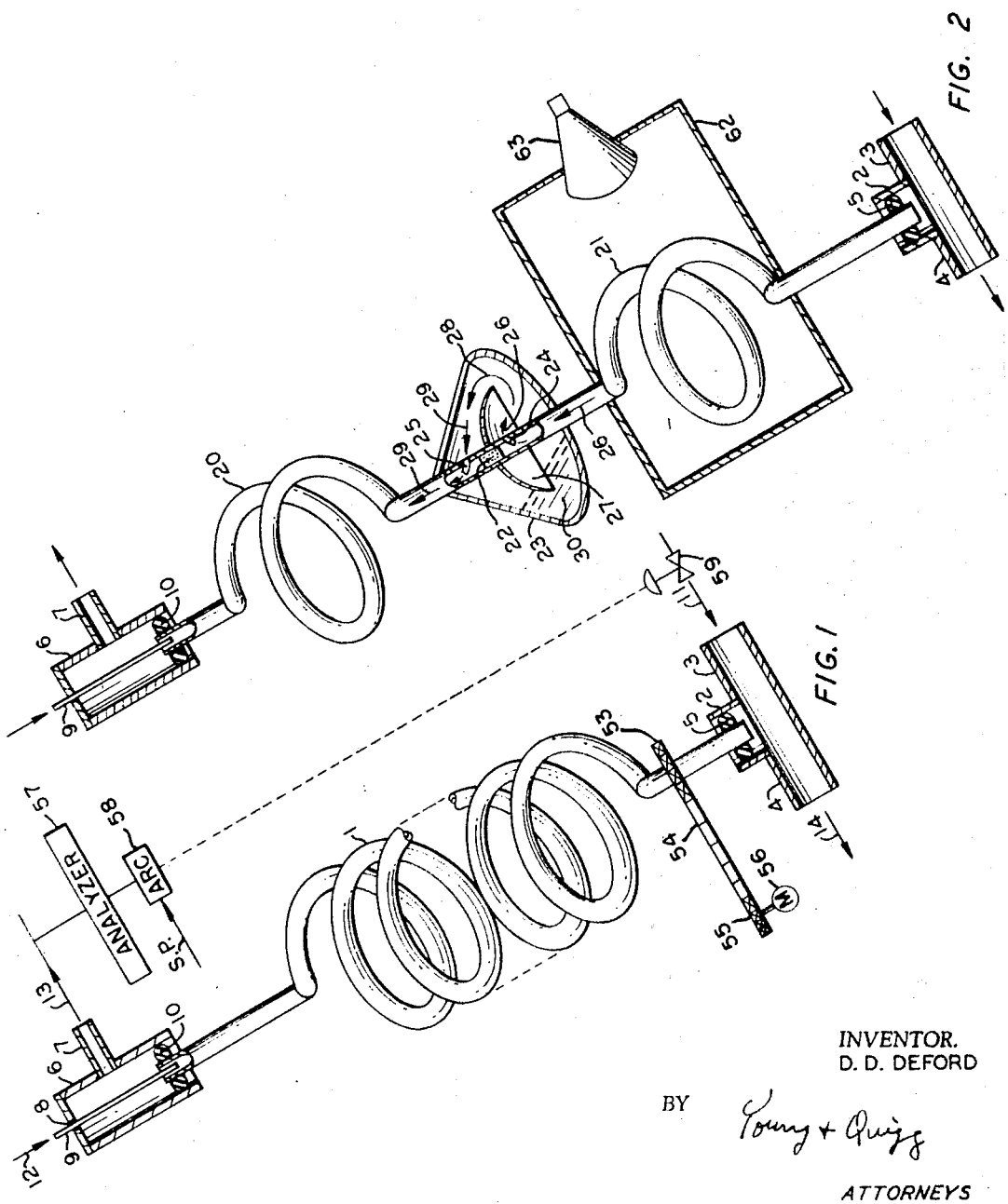
INVENTOR.
D. D. DEFORD
BY Young + Quigg
ATTORNEYS United States Patent Office 3,457,708
Patented July 29, 1969

3,457,708
MATERIAL CONTACTING APPARATUS
Donald D. Deford, Glenview, Ill., assignor to Phillips Petroleum Company, a corporation of Delaware
Filed Mar. 6, 1967, Ser. No. 620,820
Int. Cl. B01d 15/08
U.S. Cl. 55—386                                    10 Claims

ABSTRACT OF THE DISCLOSURE

A rotatable helical coil is employed at an angle off verticle and is used for countercurrent contacting of materials, especially for preparative chromatography.

---

Figure 3:
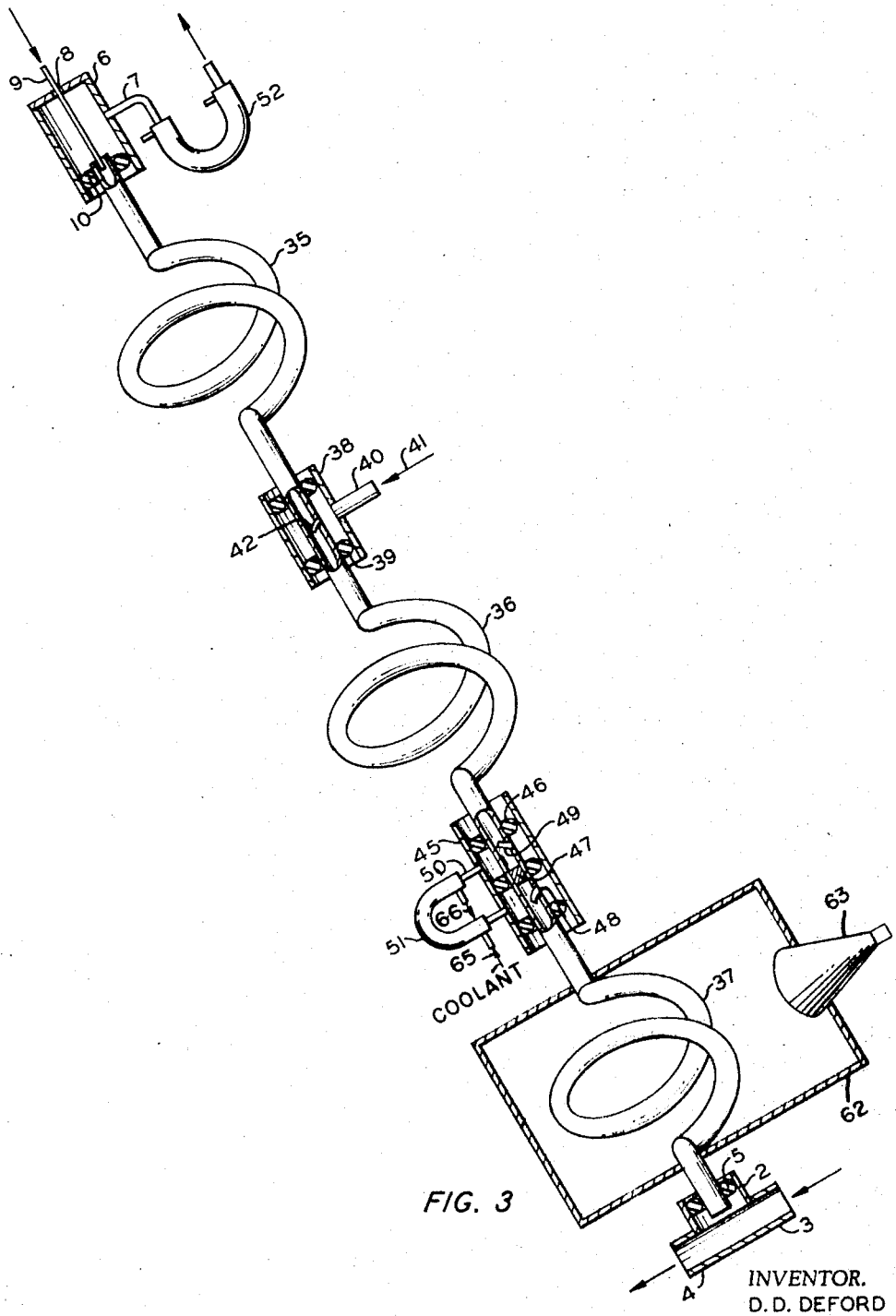

This invention relates to gas-liquid and liquid-liquid contactors, In some of its many aspects this invention relates to apparatus for stripping, absorbing, fractionating, extracting, and similarly treating and/or purifying various materials and combinations thereof. In one aspect this invention relates to apparatus for preparing a sample for subsequent chromatographic anaylsis.

Heretofore gas-liquid contactors have been used wherein the liquid passes in an open, relatively unconfined helical path on the interior surface of an open cylinder. Although this type of gas-liquid contacting apparatus works very well, in some instances it is possible that the liquid passing in the helical path can jump from helical loop to helical loop without traveling the full distance around the loops thereby shortcutting the time period of contact of that liquid with a gas. In other words, liquid can diffuse along a line parallel to the longitudinal axis of the containing cylinder instead of helically around the longitudinal axis, this phenomenon being termed end-to-end diffusion between adjacent helical loops of liquid. This end-to-end fusion phenomenon can also be accentuated as the band of fluid approaches the bottom of the container because the band tends to become wider at the bottom of the container and therefore their probability of touching greatly increased. Also, liquid-liquid contacting is difficult in such apparatus.

According to this invention there is provided contacting apparatus which utilizes a helical path of travel for the materials being contacted and thereby obtains the advantages of a helical path, e.g., the obtention of extremely long contacting paths using a very short length contacting area. The apparatus of this invention also has the advantages that end-to-end diffusion between adjacent helical paths is impossible so that all matrials passing through the apparatus follow the same length of path of travel and that the apparatus can readily be employed for either gas-liquid contacting or liquid-liquid contacting with no modification to the apparatus for either type of use.

By this invention the basic apparatus employs at least one helical tube carried at an angle off vertical, i.e., from at least 1° to 90° off the vertical, conduit means for introducing a liquid or a gas into the bottom end of the lower most helical tube and conduit means for removing a liquid from that same bottom end. There is also provided conduit means for introducing a liquid into the top of the uppermost helical tube and also conduit means for removing gas or liquid from that same top end.

In one aspect the apparatus employs at least two helical tubes at least two of which are separated by a liquid container that surrounds an area of the tubes that is blocked by a perforated plug. Outlet means are provided in the tubes on either side of the perforated plug but within the volume confined by the container so that a fluid passing through one tube passes through one outlet means, through the container, and into the next tube through the next outlet means. The apparatus can be used for purifying a sample with substantially no loss of desired components from the sample.

Still another aspect of the apparatus of this invention employs at least three helical tubes, two helical tubes being separated by a sample inlet means, and two other helical tubes, only one of which can be common with the first-mentioned two helical tubes, being interiorly plugged. Outlet means are provided on either side of the plugged area of the tubes and a trap means is associated with the outlet means so that a fluid traveling into one outlet will have to pass through the trap means before it can reach the next outlet and continue its path of travel through the next helical tube.

In another aspect of this invention any of the apparatus discussed hereinabove is operatively connected to at least one chromatographic analyzer adapted to analyze the effluent gas and/or liquid from either end of the apparatus and is operatively connected to conventional control means to, in response to such analysis, control at least one process condition under which the apparatus is being operated so as to adjust the operation of the apparatus to obtain an output gas or liquid of desired composition.

The apparatus of this invention is useful for gas-liquid contacting and is more particularly useful for liquid-liquid contacting such as conventional liquid-liquid solvent extraction. A unique feature of this apparatus is that it can be used interchangeably for gas-liquid or liquid-liquid contacting with no modification to the apparatus. Therefore, the apparatus is very flexible as to the particular type of contacting operation desired. The apparatus can be used to strip a component from a gas into a liquid, to extract a component from one liquid into another liquid, to absorb components from a liquid into a gas, and the like. A particularly practical use for this apparatus is in preparing a sample for subsequent chromatographic analysis by extracting, absorbing, stripping, or otherwise removing one or more undesired or unnecessary components from that sample before it is subjected to chromatographic analysis. Such a procedure renders the sample more amenable to chromatographic analysis and at the same time insures that the results of the analysis will be more accurate because of the absence of minor amounts of undesirable components that tend to confuse interpretation of the data obtained from the chromatographic analysis operation. The apparatus of this invention is also useful in purifying a material such as a hydrocarbon solvent by extracting or otherwise fractionating the solvent to remove impurities therefrom. The apparatus of this invention can be used to purify or fractionate substantially any material that contains extractable, vaporizable, absorbable, etc., components. For example, this invention can be used in upgrading a gasoline or other similar petroleum product by extracting and/or boiling impurities therefrom.

Accordingly, it is an object of this invention to provide a new and improved material contacting apparatus. It is also an object of this invention to provide a new and improved gas-liquid contacting and liquid-liquid contacting apparatus which can be used interchangeably with no modifications on mixtures of gases, mixtures of gases and liquids, and mixtures of liquids. It is another object of this invention to provide a new and improved apparatus for preparative chromatography. It is another object of this invention to provide a new and improved fractionation apparatus particularly as to extracting, stripping, vaporizing, and the like. It is another object of this invention to provide an extremely efficient purification apparatus.

Other aspects, objects, and the several advantages of this invention will be apparent to those skilled in the art from the description, drawings, and appended claims.

FIGURES 1 through 3 show apparatus embodying this invention.

FIGURE 1 shows a helical tube 1 inclined at an angle off vertical and terminated at its lower end by a housing 2 which carries an upper conduit 3 and lower conduit 4. Housing 2 is rotatably carried on the lower end of tube 1 by way of a conventional bearing-sealing means 5 such as a polytetrafluoroethylene packing gland or other similar conventional apparatus well known in the art.

The upper end of tube 1 is terminated by a housing 6 having an outlet conduit 7 and an opening 8 through which is inserted conduit 9. Conduit 9 passes through housing 6 and part way into the interior of tube 1. A rotating, bearing and sealing means 10 that is similar to means 5 is used to carry housing 6 on the upper end of tube 1.

Tube 1 is rotated by any conventional means (not shown). For example, a gear can be affixed to one or both ends or an intermediate portion of tube 1, a chain mounted on the gear, and the gear rotated by a small electric motor. This is accomplished by gear 53 driven by chain 54 driven in turn by gear 55 rotated by motor 56. Tube 1 can also be rotated by hand or any other means known in the art. The tube is rotated so that drops of liquid that might collect at the lower points of each turn of the tube are spread out by centrifugal force so that the other material, be it gas or liquid, contacts a thin film of liquid rather than a drop of liquid and therefore more intimate contacting of materials is obtained.

Tubes of this invention can be rotated at any desired speed but are preferably rotated in the range of from about 3 to about 50, preferably from about 5 to about 20, revolutions per minute. Functionally stated, the rotation speed will be at a rate sufficient to spread liquid present in the tube into a substantially thin film but at a rate insufficient to keep liquid from running down to the lower end of the tube.

The tubes of this invention can be formed from any conventional material such as copper, nylon, aluminum, glass, polyethylene, polypropylene, and the like depending upon the particular process to be employed. The tube can be utilized empty or partially or wholly filled with any conventional packing such as glass beads, wire mesh, and the like. The tube can be heated locally or entirely by inserting the part or all of the apparatus or the tube or tubes in an oven. The tube can be heated by local application of heat to establish a thermal gradient along the length of the tube, thereby varying separation conditions along that length. The tube can be operated while in a horizontal position or in any angled position other than a substantially vertical position.

The particular processes that can be carried out in the apparatus of this invention are legion in number and vary widely depending upon not only the particular materials, temperatures, pressures and the like employed but also upon the particular composition of the tube itself. For example, when contacting two liquid phases one of which is heavier than the other, and wets the walls of the tube while the lighter phase does not wet the tube, the heavier phase can be added at the top of the tube whereas the lighter phase that does wet the tube walls can be added at the bottom thereof. If the heavier phase wets the walls of the tube it is possible that the heavier phase can be introduced into the bottom of the tube instead of the top and because of the wetting effect and the rotation of the helical tube the heavier phase can be made to, in effect, climb from the bottom to the top of the tube. Innumerable variations and combinations of materials and effects can be achieved with the apparatus of this invention. The various combinations and effects will be obvious to one skilled in the art and are too numerable to list here and therefore further details will not be set forth.

Thus, in the operation of the apparatus of FIGURE 1, a liquid or gas is introduced into the bottom of tube 1 through conduit 3 as shown by arrow 11 while a liquid is introduced into the top of tube 1 through conduit 9 as shown by arrow 12. The materials so introduced will contact each other countercurrently throughout the total length of the path of travel defined by tube 1 and the product gas or liquid will be removed through conduit 7 as shown by arrow 13 while product liquid is removed from conduit 4 as shown by arrow 14.

FIGURE 2 shows two helical tubes 20 and 21 separated by a porous plug 22. The porous plug can be made of any suitable material such as coalesced particles of polyethylene, polypropylene, nylon, and the like or sintered particles of copper, aluminum, and the like. The porous plug should have a porosity such that a liquid contacting a part of the plug, e.g., the bottom third, will fill all the pores of the plug with liquid by capillary action thereby making the plug substantially gas impervious.

Around the area between tubes 20 and 21 which carries plug 22 there is mounted a container 23.

Lower tube 21 contains an outlet 24 and upper tube 20 contains a similar outlet 25. Outlet 24 is curved and travels a finite distance into the interior of tube 21 pointing toward the lower end of tube 21 so that its outlet orifice also points toward that lower end. Thus, liquid or vapor rising through tube 21 is forced through outlet 24 into container 23 as shown by arrows 26 since plug 22 is filled with liquids introduced through conduit 9 and passing through both tubes 20 and 21 and out conduit 4. A baffle means 27 is mounted in the interior of container 23 and pointed outwardly from the tubes toward the bottom of tube 21 so that gas or liquid passing through inlet 24 must take a tortuous path, as shown by arrow 28, in order to reach outlet 25 and pass therethrough as shown by arrows 29. In traveling through container 28 the material introduced through conduit 3 and rising through tubes 20 and 21 and exiting through conduit 7 will come in contact with a liquid sample 30 in container 23 thereby extracting impurities from that sample and carrying same out of the system by way of conduit 7.

Coils 20 and 21 and container 23 can be individually heated or cooled so as to maintain a desired temperature gradient throughout the apparatus and thereby effect the desired separation. For example, coil 21 can be maintained by a heat source such as heat lamp 63 inclosed by housing 62, at a temperature greater than the temperature of coil 20, preferably at least 3° C. greater, so that volatile components removed from sample 30 will pass out of the system through conduit 7 whereas desired components in sample 30 which may be volatilize and try to travel upward through the system through outlet 25 and tube 20 are condensed and pass downwardly with the liquid being introduced through conduit 9 into tube 21 to be vaporized and returned to the interior of container 23 through outlet 24 for condensation and return to sample 30. Therefore, by keeping the temperature of tube 21 greater than that of tube 20, container 23 acts as a trap for the desired components and sample 30 can be purified to a very great extent with substantially no loss of the desired components of sample 30. Tubes 20 and 21 as well as container 23 can all be rotated during operation of the apparatus.

FIGURE 3 shows three coils 35, 36, and 37. Tubes 35 and 36 carry a housing 38 which is rotatably attached by way of rotatable sealer bearing 39 and which carries an inlet conduit 40 for introduction of sample or material to be treated as shown by arrow 41. An inlet 42 is integrally carried by the tube, the inlet extending into the interior of the tube a finite distance and pointing toward the bottom of the apparatus so that the introduced sample will be directed downwardly into tube 36.

Tubes 36 and 37 carry a housing 45 which is rotatably supported by three rotatable sealer bearings 46. Internal communication between tubes 36 and 37 is blocked by nonporous plug 47. Tube 37 carries integrally therewith outlet 48, this outlet extending inwardly into the interior of tube 37 and pointing its opening toward the bottom of tube 37. Similarly, tube 36 carries an integral outlet 49 that extends into the interior of tube 38 and points its opening toward the top of that tube.

A trap means 50 is openly connected to the interior of housing 45 on either side of plug 47 so that a material passing through outlet 48 has to pass through trap 50 before it can reach outlet 49 and therefore tube 30. Trap 50 is provided with a conventional heat exchange sleeve 51 so that a portion of trap 50 can be artificially heated or cooled as desired such as by coolant supplied to sleeve 51 by conduit 65 and removed therefrom by conduit 66. Similarly, conduit 7 is provided with a heat exchange sleeve 52 for artificial heating or cooling as desired.

Trap 50, and tubes 35 through 37 can each be heated or cooled to differing temperatures depending upon the type of operation being carried out. For example, tubes 35 and 36 can be maintained at the same temperature, that temperature being sufficient to vaporize lighter materials from the sample being introduced through outlet 42 so that the lightest material is vaporized from the sample and passes out of the system through conduit 7. This light material can be trapped in conduit 7 by way of heat exchanger 52. The intermediate and heavier materials in the sample then pass downwardly through tube 36, outlet 49, and into trap 50 wherein the desired intermediate components are liquefied or solidified by way of heat exchanger 51 and the heavier components pass on through outlet 48 into tube 37. Tube 37 is maintained by a heat source such as heat lamp 63 inclosed by housing 62, at a temperature higher than tubes 35 and 36 so that any desired components that may reach tube 37 are vaporized and carried upwardly by the gas and/or liquid introduced through conduit 3 and back into trap 50.

The apparatus of FIGURE 1 is admirably suited for either gas-liquid or liquid-liquid contacting whereas the apparatus of FIGURES 2 and 3 are more suitable for gas-liquid contacting.

The apparatus of this invention can have its output conduits, e.g., conduits 3 and 7 of FIGURES 1 through 3, each connected to a conventional chromatographic analyzer, the chromatographic analyzer being adapted to analyze the effluent product from the apparatus and to, based upon the results of the analysis, adjust one or more process variables such as temperature, and the like, to cause the product being analyzed by the chromatographic analyzer to approach a desired composition. Conventional control apparatus can be connected to the chromatographic analyzer for automatically adjusting process variables when the composition of the effluent being analyzed varies from that desired or this adjustment can be made manually after analysis of the chromatographic analysis data. The apparatus for such a control situation is fully and completely described in the Western Petroleum Refiners Association report Tech-59-33 entitled "Automatic Control with High Speed Chromatography" by Fourroux et al., Western Petroleum Refiners Association, 416 Beacon Building, Tulsa, Okla. This type of control system is shown in FIGURE 1, comprising analyzer 57, controller 58, which receives a set point representative of the desired concentration, which positions valve 59 in conduit 11 to complete the composition control loop.

Thus, in the particular apparatus of this invention if primarily component A is desired from the top of the apparatus and primarily compenent B is desired from the bottom of the apparatus the ratio of the concentrations of A to B in both the top and the bottom of the apparatus would desirably be $$A/B \text{ top} = B/A \text{ bottom}$$

Thus, the temperature or the process variables of the apparatus can be adjusted until the ratios in the above equation are substantially equal in order to make a neat separation of components A and B or the apparatus can be run hotter than is necessary to get the ratios of the above equation substantially equal thereby obtaining substantially pure component B from the bottom of the apparatus. Similarly, the apparatus can be run cooler to obtain a more pure fraction of component A from the top of the apparatus.

EXAMPLE I

A ¼ inch outside diameter polyethylene helix as shown in FIGURE 1 formed of 35 six-inch diameter coils is rotated at 10 r.p.m. and maintained at room temperature. Hydrogen gas is introduced into the bottom of the tube through conduit 3, the hydrogen gas carrying 1 weight percent normal hexane based on the total weight of the mixture of hydrogen gas and normal hexane, the rate of introduction being 500 milliliters per minute. Dimethylether of tetraethyleneglycol is introduced into the top of tube 1 through conduit 9 at the rate of 5 milliliters per minute. Substantially all of the normal hexane is extracted from the hydrogen by the glycol and removed from the bottom of the tube through conduit 4. Substantially pure hydrogen is removed from the top of the tube through conduit 7.

EXAMPLE II

Apparatus as shown in FIGURE 2 is employed using 2 coils as described in Example I. The two coils and container are rotated at 10 r.p.m. while dimethylether of tetraethyleneglycol is passed at the rate of 1 milliliter per minute through conduit 9 into tube 20 and hydrogen gas at 150 milliliters per minute is introduced through conduit 3. An equal weight mixture of 3-methylpentane, normal hexane, and normal pentane is disposed as sample 30 in container 23. Coil 20 is maintained at 23° C. and coil 21 is maintained at 27° C. Porous plug 22 is formed from polyethylene particles subjected to elevated temperature and pressure until incipient fusion occurs. Normal hexane is removed through conduit 4 while normal pentane is removed from conduit 7, the 2-methylpentane remaining in container 23 as the purified sample.

EXAMPLE III

The apparatus of FIGURE 3 is used employing three coils the same as the coil described in Example I. The coils are rotated at a speed of 10 r.p.m. Hydrogen carrier gas is introduced through conduit 3 at the rate of 140 milliliters per minute while dimethylether of tetraethyleneglycol is introduced through conduit 9 at the rate of 1 milliliter per minute. A nonporous plastic plug is employed for plug 47. A sample composed of a 50–50 weight mixture of normal hexane and 2-methylpentane is introduced through conduit 40 at a rate of 1 milliliter per minute. The temperature of tubes 35 and 36 is 25° C. while the temperature of tube 37 is 50° C. The 2-methylpentane is removed through conduit 7 while the normal hexane concentrates in trap 50.

Reasonable variations and modifications are possible within the scope of this disclosure without departing from the spirit and scope thereof.

I claim:

1. Apparatus comprising a helical tube carried at an angle off vertical, first conduit means for introducing a fluid into the lower end of said tube and also for removing a fluid from said lower end, second conduit means for introducing a fluid into the interior of the upper end of the tube, third conduit means for containing and transmitting fluid that issues from said upper end, means for rotatably mounting said tube with respect to said conduit means, and means for rotating said tube.

2. The apparatus according to claim 1 wherein said first conduit means comprises a header means carried by and over said lower end by a rotatable means, said header means having an upper conduit in communication therewith and a lower conduit in communication therewith, said second conduit means extending into the interior of said upper end of said tube, and said third conduit means comprising a header that fits around said second conduit means and is carried by and over said upper end of said tube by a rotatable means, said second conduit means extending through and out of an exterior side of said third conduit means, said third conduit means having an exit conduit in communication with an upper portion thereof.

3. The apparatus according to claim 1 wherein there are at least two tubes and said tubes are joined by a porous plug, a fluid container carried by said tubes around the area of said porous plug, inside said container the tube on the lower side of said plug carries a first outlet means that establishes communication between the interiors of said container and said lower tube, a portion of said first outlet means extending into the interior of said tube and toward the lower end of said lower tube so that the opening of said first outlet means is pointed toward the lower end of said lower tube, inside said container the tube on the upper side of said plug carries a second outlet means that establishes communication between the interior of said container and said upper tube, a portion of said second outlet means extending into the interior of said upper tube so that the opening of said second outlet means is pointed toward the upper end of said upper tube, and baffle means carried in the interior of said container to cause a tortuous path of fluid flow from said first outlet to said second outlet.

4. The apparatus according to claim 3 wherein said porous plug has a porosity such that liquid contacting a portion of said plug will fill substantially all the pores of said plug thereby rendering same substantially gas impervious, said first outlet means comprises a first conduit integral with said lower tube and extending a finite distance into the interior of said lower tube towards the lower end of said lower tube, said second outlet means comprising a second conduit integral with said upper tube and extending a finite distance into the interior of said upper tube toward the upper end of said upper tube, and said baffle means comprises an arcuate member carried by said tubes at a point intermediate said first and second outlets and extending outwardly from said tubes towards the lower end of said container but stopping short of the walls of said container to thereby provide a passage for fluid traveling between said first and second outlets.

5. The apparatus according to claim 3 wherein means is provided for heating at least one of said container and said tubes.

6. The apparatus according to claim 1 wherein there are at least three tubes, a first combination of at least two of said tubes having an inlet means at the area of their juncture, a second combination of at least two of said tubes, only one of which tubes in said second combination can be common with the tube in said first combination, said second combination of tubes being internally plugged to prevent fluid communication between the joined ends of said tubes, a fluid container housing externally carried by said second combination of tubes, said housing being carried so that said second combination of tubes can be rotated without moving said housing, a trap means communicating with the interior of said housing on each side of the plugged portion of said second combination of tubes, outlet means within said housing and carried on each side of said plugged portion of said second combination of tubes so that fluid passing from one outlet must pass through said trap means before reaching the other outlet.

7. Apparatus according to claim 6 wherein means is provided for heating at least one of said tubes, and means is provided for cooling said trap means.

8. The apparatus according to claim 6 wherein said inlet means comprises a second housing carried by said first combination of tubes so that said first combination of tubes can be rotated without moving said second housing, a first conduit integral with said first combination of tubes within said second housing, said first integral conduit extending a finite distance into the interior of the lower tube of said first combination, the opening in said first integral conduit being pointed toward the lower end of said lower tube, said trap means comprising an externally cooled loop conduit, and said outlet means comprising conduits integral with said second combination of tubes and extending a finite distance into the interior of said tubes, the outlet above the plugged portion extending toward the upper end of the tube with which it is integral and having its opening pointed toward said upper end, and the outlet below the plugged portion extending toward the lower end of the tube with which it is integral and having its opening pointed toward said lower end.

9. The apparatus according to claim 6 wherein a chromatographic analyzer is operatively connected to at least one of the upper product stream and the lower product stream of the apparatus, said chromatographic analyzer being adapted to analyze the product stream passing therethrough, and control means operatively connected to said chromatographic analyzer for adjusting at least one operating condition of said apparatus in response to the analytical results obtained by said chromatographic analyzer from its analysis of the product stream passing therethrough.

10. The apparatus according to claim 1 wherein at least one chromatographic analyzer is operatively connected to at least one product stream from said apparatus, said chromatographic analyzer, being adapted to analyze said product stream, and control means operatively connected to said chromatographic analyzer for adjusting at least one operating condition of said apparatus in response to the analysis result of said chromatographic analyzer.

References Cited

FOREIGN PATENTS 1,289,913   2/1962   France.

REUBEN FRIEDMAN, Primary Examiner

J. L. DeCESARE, Assistant Examiner

U.S. Cl. X.R.

23—269